United States Patent
Hashimoto et al.

(10) Patent No.: US 11,085,429 B2
(45) Date of Patent: Aug. 10, 2021

(54) COMPRESSION DEVICE

(71) Applicant: KOBE STEEL, LTD., Hyogo (JP)

(72) Inventors: Koichiro Hashimoto, Takasago (JP);
Naofumi Kanei, Takasago (JP);
Takuya Washio, Takasago (JP);
Daisuke Wada, Takasago (JP);
Ryosuke Mori, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 111 days.

(21) Appl. No.: 16/428,466

(22) Filed: May 31, 2019

(65) Prior Publication Data

US 2019/0376862 A1 Dec. 12, 2019

(30) Foreign Application Priority Data

Jun. 6, 2018 (JP) .............................. JP2018-108771

(51) Int. Cl.
*F04B 25/00* (2006.01)
*G01L 15/00* (2006.01)
(Continued)

(52) U.S. Cl.
CPC ............ *F04B 25/00* (2013.01); *F04B 39/121* (2013.01); *F04B 39/14* (2013.01); *F04B 49/06* (2013.01); *F04B 49/065* (2013.01); *G01L 15/00* (2013.01); *G01L 19/147* (2013.01); *F04B 2205/01* (2013.01); *F04B 2205/02* (2013.01);
(Continued)

(58) Field of Classification Search
CPC .... F04B 45/043; F04B 45/045; F04B 45/047; F04B 39/0005; F04B 39/1066; F04B 39/121; F04B 39/10; F04B 39/123; F04B 53/1072; F04B 2205/01–05; F04B 25/00; F04B 49/065; F04B 49/06; F04B 49/22;
(Continued)

(56) References Cited

U.S. PATENT DOCUMENTS 3,229,502 A * 1/1966 Pappas .................. G01N 25/142
 73/29.03
5,275,732 A * 1/1994 Wang ........................ C02F 3/34
 210/601
(Continued)

FOREIGN PATENT DOCUMENTS

CN 203476710 U 3/2014
JP H109147 A 1/1998
(Continued)

OTHER PUBLICATIONS

The extended European search report issued by the European Patent Office dated Jul. 11, 2019, which corresponds to European Patent Application No. 19175547.9-1004 and is related to U.S. Appl. No. 16/428,466.

*Primary Examiner* — Essama Omgba
*Assistant Examiner* — Christopher J Brunjes
(74) *Attorney, Agent, or Firm* — Studebaker & Brackett PC (57) ABSTRACT

A compression device (1) includes compression portions, a suction line, connection lines, a discharge line, and display portions (d) configured to display pressure values, pressure gauges (PG1 to PG6) provided for at least one of the suction line, the connection lines, and the discharge line and a housing (40). The housing (40) includes a peripheral wall (42) and a door (44). The pressure gauges (PG1 to PG6) are situated at positions to face the door (44).

9 Claims, 7 Drawing Sheets

(51) Int. Cl.
*G01L 19/14* (2006.01)
*F04B 49/06* (2006.01)
*F04B 39/12* (2006.01)
*F04B 39/14* (2006.01)

(52) U.S. Cl.
CPC ....... *F04B 2205/03* (2013.01); *F04B 2205/04* (2013.01); *F04B 2205/05* (2013.01)

(58) Field of Classification Search
CPC .......... F04B 49/08; F04B 39/14; F04B 41/06; G01L 15/00; G01L 19/147
See application file for complete search history.

(56) References Cited

U.S. PATENT DOCUMENTS

| | | | |
|---|---|---|---|
| 5,401,149 A | 3/1995 | Tsuru et al. | |
| 5,613,843 A | 3/1997 | Tsuru et al. | |
| 6,076,545 A * | 6/2000 | Cooper | A62C 35/68 |
| | | | 137/360 |
| 2009/0218327 A1 * | 9/2009 | Beeson | F02B 63/06 |
| | | | 219/133 |
| 2009/0311114 A1 | 12/2009 | Schulz et al. | |
| 2013/0099558 A1 * | 4/2013 | Hart | F02D 29/06 |
| | | | 307/9.1 |
| 2014/0318747 A1 | 10/2014 | Nagura et al. | |
| 2016/0348840 A1 | 12/2016 | Nagura et al. | |
| 2017/0268498 A1 * | 9/2017 | Kasahara | F04B 49/22 |
| 2018/0202689 A1 * | 7/2018 | Ieda | F25B 49/022 |
| 2018/0209697 A1 * | 7/2018 | Nishida | F25B 1/10 |
| 2018/0274726 A1 | 9/2018 | Nagura et al. | |
| 2020/0191108 A1 * | 6/2020 | Diaz | F03B 17/005 |

FOREIGN PATENT DOCUMENTS

| | | |
|---|---|---|
| JP | 2011-132876 A | 7/2011 |
| JP | 5433611 B2 | 3/2014 |
| JP | 2017-137926 A | 8/2017 |
| KR | 0129681 B1 | 4/1998 |
| WO | 2012142262 A1 | 10/2012 |
| WO | 2015/125585 A1 | 8/2015 |
| WO | WO-2017073212 A1 * | 5/2017 ......... G05D 23/1927 |

* cited by examiner

COMPRESSION DEVICE

TECHNICAL FIELD

The present invention relates to a compression device configured to compress gas.

Background Art

Conventionally, multi-stage compression type compression devices have been known. For example, JP 2014-214928 A discloses a compression device including a first compression portion for compressing gas, a second compression portion for further compressing the gas discharged from the first compression portion a first cooler for cooling the gas discharged from the first compression portion, a second cooler for cooling the gas discharged from the second compression portion, and a connection path connecting each compression portion to each cooling unit. The compression device includes a connection path branch portion branched from the connection path. A pressure gauge and a safety valve are attached to the end of the connection path branch portion.

JP 2015-232384 A. JP 2011-132876 A and JP 2017-137926 A disclose compression devices each of which includes a compressor and a housing configured to house the compressor.

When the compression device described in JP 2014-214928 A is stored in the housing, instruments such as a pressure gauge and a safety valve are situated in the housing. This makes it difficult for a worker to perform maintenance or inspection work of the instruments.

SUMMARY OF INVENTION

An object of the present invention is to provide a compression device which allows easy maintenance or easy inspection work of the instruments situated in the housing.

A compression device according to one aspect of the present invention includes: compression portions configured to compress gas, respectively: a suction line configured to supply the gas to a compression portion which is situated at a lowest stage side among the compression portions; connection lines configured to connect the compression portions: a discharge line configured to flow the gas which is discharged from a compression portion situated at a highest stage side among the compression portions; pressure gauges including display portions configured to display detected pressure values, the pressure gauges being provided for at least one of the suction line, the connection lines and the discharge line; and a housing in which the compression portions and the pressure gauges are stored. The housing includes: a peripheral wall situated at least around the compression portions and the pressure gauges; and a door configured to open and close an opening formed on the peripheral wall. The display portions of the pressure gauges are situated at positions to face the door.

The object, feature and advantage of the aforementioned compression device will be more apparent from the following detailed description and the accompanying drawings.

DESCRIPTION OF EMBODIMENTS

Figure 1:
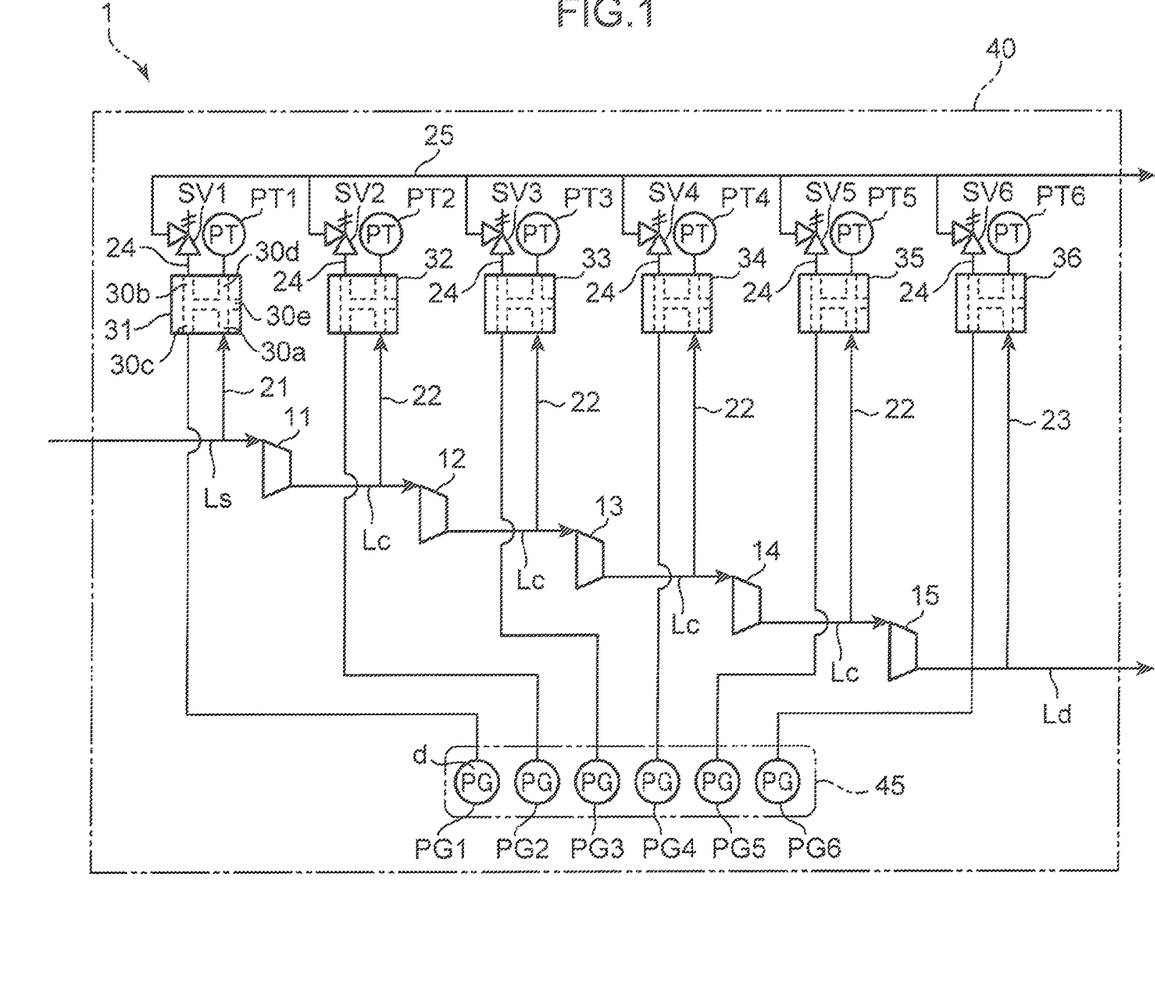
FIG. 1 is a schematic view of a configuration of a compression de vice according to one embodiment.
Figure 2:
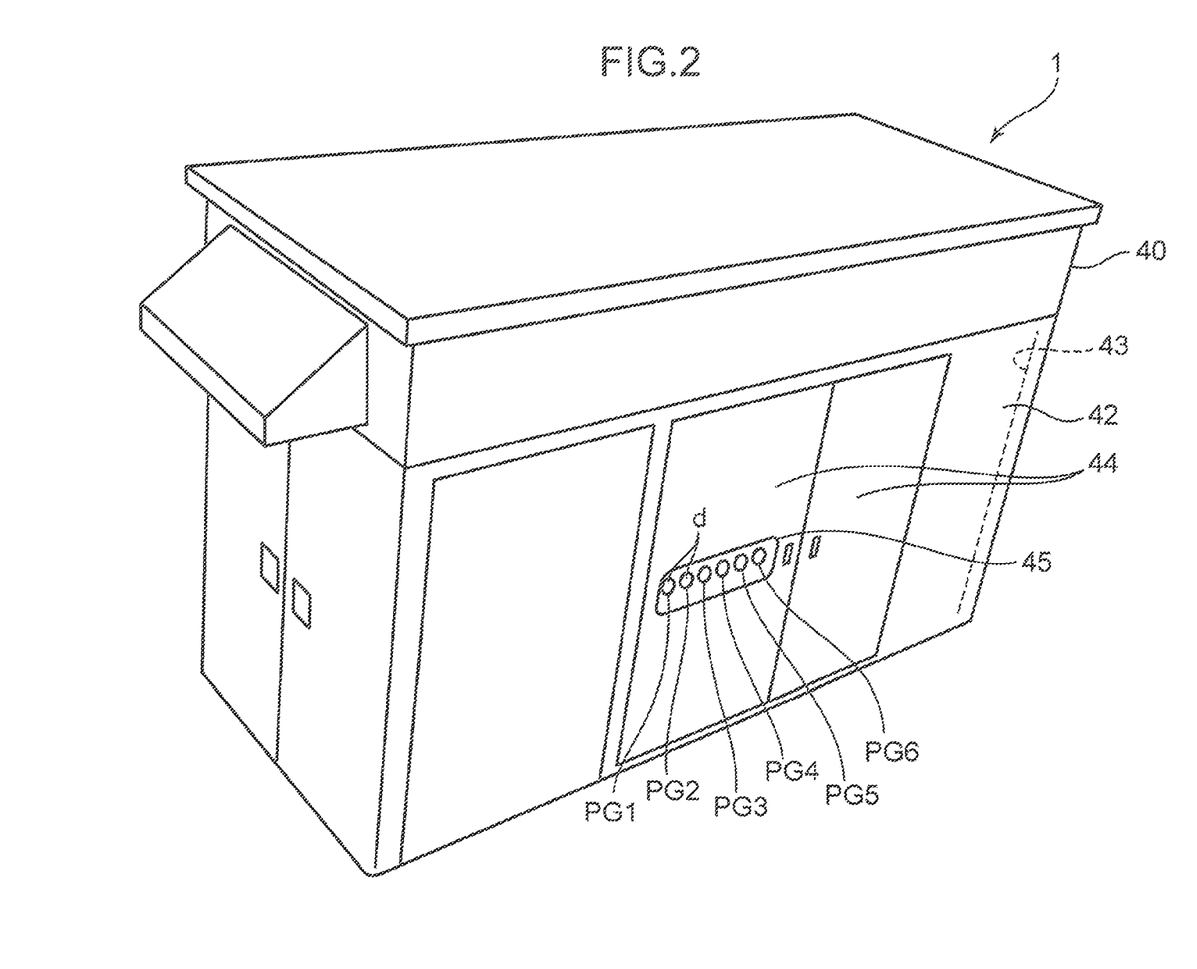
FIG. 2 is a perspective view of the compression device shown in FIG. 1.

A compression device of one embodiment is described with reference to FIGS. 1 to 5. As shown in FIG. 1, the compression device 1 includes compression portions 11 to 15, a suction line Ls, connection lines Lc, a discharge line Ld, manifolds 31 to 36, pressure gauges PG1 to PG6, safety valves SV1 to SV6, pressure transmitters PT1 to PT6 and a housing 40 (c.f. FIG. 2).

The compression portions 11 to 15 compress a gas (e.g. hydrogen gas). With regard to the present embodiment, the compression portions 11 to 15 include the first compression portion 11 configured to compress gas, the second compression portion 12 configured to further compress the gas discharged from the first compression portion 11, the third compression portion 13 configured to further compress the gas discharged from the second compression portion 12, the fourth compression portion 14 configured to further compress the gas discharged from the third compression portion 13, and the fifth compression portion 15 configured to further compress the gas discharged from the fourth compression portion 14. However, it is not limited to 5 how many compression portions are arranged if there are more than 2 compression portions. Each of the compression portions 11 to 15 includes a suction port (not shown) for sucking gas and a discharge port (not shown) for discharging gas. The compression portions 11 to 15 are provided in a single compressor.

The suction line Ls is a line for supplying gas to the first compression portion 11. The downstream end of the suction line Ls is connected to the suction port of the first compression portion 11.

Each connection line Lc connects the compression portions 11 to 15. In details, each connection line Lc connects a discharge port of a specific compression portion to a suction port of a higher-stage compression portion than the specific compression portion.

The discharge line Ld is a line for flowing the gas discharged from the fifth compression portion 15. The upstream end of the discharge line is connected to the discharge port of the fifth compression portion 15.

The pressure gauges PG1 to PG6 are provided for the suction line Ls, the four connection lines Lc and the discharge line Ld, respectively. The pressure gauges PG1 to PG6 are configured to detect a pressure of the gas flowing through the lines Ls, Lc, Ld. Each of the pressure gauges PG1 to PG6 includes a display portion d configured to display a value of a detected pressure.

The safety valves SV1 to SV6 are provided for the suction line Ls, the tour connection lines Lc and the discharge line Ld, respectively. The safety valves SV1 to SV6 are configured to open when a pressure of a corresponding line becomes higher than a predetermined threshold. For example, the safety valve SV1 functions as the first safety valve, and each of the safety valves SV2, SV3 functions as the second safety valve. All the safety valves SV1 to SV6 including the first safety valve and the second safety valves have the same configuration. The configuration of the compression device is not limited to live configuration in which the six safety valves SV1 to SV6 are provided. If the number of compression portions 11 to 15 is changed, the number of safety valves may also be changed in accordance with the number of compression portions. The safety valves may be omitted.

The pressure transmitters PT1 to PT6 are provided for the suction line Ls, the four connection lines Lc and the discharge line Ld, respectively. For example, the pressure transmitter PT1 functions as the first pressure transmitter, and each of the pressure transmitters PT2, PT3 functions as the second pressure transmitter. All the pressure transmitters PT1 to PT6 including the first pressure transmitter and the second pressure transmitter have the same configuration. The configuration of the compression device is not limited to the configuration in which the six pressure transmitters PT1 to PT6 are provided. For example, if the number of compression portions 11 to 15 is changed, the number of pressure transmitters may also be changed in accordance with the number of compression portions. The pressure transmitters may be omitted.

The pressure transmitters PT1 to PT6 may transmit pressure values in the lines Ls, Lc, Ld to a control device. The control device may be provided inside or outside the housing 40. Signals of the pressure values may be transmitted to the control device either by wire or wirelessly.

The manifolds 31 to 36 are provided for the suction line Ls, the four connection lines Lc and the discharge line Ld, respectively. The pressure gauges PG1 to PG6, the pressure transmitters PT1 to PT6 and the safety valves SV1 to SV6 are connected to the manifolds 31 to 36, respectively. The pressure gauges PG1 to PG6 and the pressure transmitters PT1 to PT6 detect the gas pressure via the manifolds 31 to 36, respectively. The safety valves SV1 to SV6 operate in accordance with a pressure of the gas flowing into the manifolds 31 to 36 from the corresponding lines, respectively. Specifically, the manifolds 31 to 36 include the manifold 31 provided for a pipe 21 branched from the suction line Ls, the manifolds 32 to 35 provided for pipes 22 branched from the connection lines Lc, and the manifold 36 provided for a pipe 23 branched from the discharge line Ld. For example, the manifold 31 functions as the first manifold, and each of the manifolds 32, 33 functions as the second manifold. All the manifolds 31 to 36 including the first manifold and the second manifolds have the same configuration. The configuration of the compression device is not limited to the configuration in which the six manifolds are provided. For example, if the number of compression portions 11 to 15 is changed, the number of manifolds may also be changed in accordance with the number of compression portions. The manifolds may be omitted.

Each of the manifolds 31 to 36 includes an inlet port 30a, an outlet port 30b, a pressure gauge connection port 30c, a pressure transmitter connection port 30d and a supply port 30e.

The inlet port 30a may be connected to the pipes 21 to 23 to allow inflow of the gas from the pipes 21 to 23.

The outlet port 30b allows outflow of the gas which has entered from the inlet port 30a, the outlet port 30b being configured to be connected to a pipe 24 that is connected to an inlet side of each of the safety valves SV1 to SV6. The outlet side of each of the safety valves SV1 to SV6 is connected to a pipe 25 for recovering the gas that has passed through the safety valves SV1 to SV6, respectively.

The pressure gauge connection port 30c may be connected to the pressure gauges PG1 to PG6, the pressure gauge connection port 30c being in communication with the inlet and outlet ports 30a, 30b. The pressure gauges PG1 to PG6 are connected to the pressure gauge connection port 30c.

The pressure transmitter connection port 30d may be connected to the pressure transmitters PT1 to PT6, the pressure transmitter connection port 30d being in communication with the inlet and outlet ports 30a, 30b. The pressure transmitters PT1 to PT6 are connected to the pressure transmitter connection port 30d.

Figure 4:
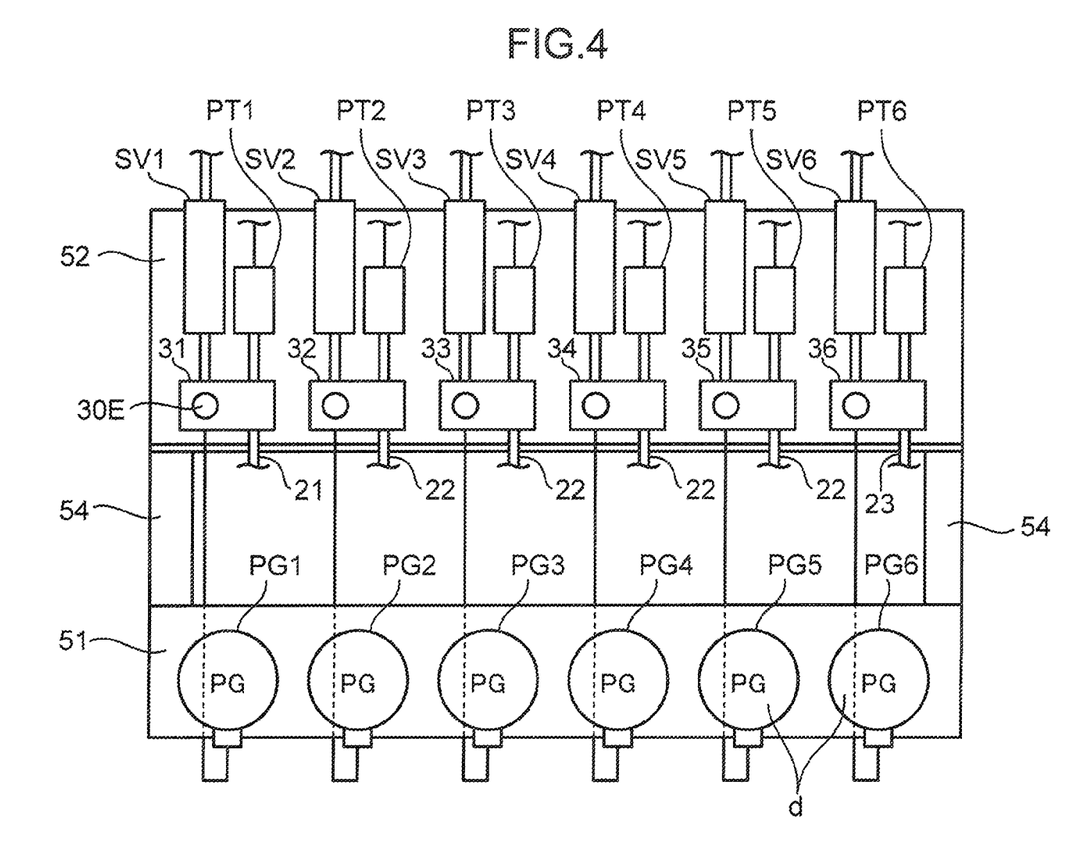
FIG. 4 is a front view schematically showing surroundings such as pressure gauges and manifolds.

The supply port 30e is a port for supplying the gas, the supply port 30e being in communication with the inlet and outlet ports 30a, 30b. Specifically, in order to inspect gas leakage from the lines Ls, Lc, Ld and the pipes 21 to 23, gas may be externally supplied to the supply port 30e under a condition in which the suction ports and the discharge ports of the compression portions 11 to 15 is closed. During an operation of the compression device 1, a cap 30E for closing the supply port 30e is attached to the supply port 30e (c.f. FIG. 4).

The housing 40 houses the compressors (the first to fifth compression portions 11 to 15), the pressure gauges PG1 to PG6, the safety valves SV1 to SV6, the pressure transmitters PT1 to PT6, the manifold 31 to 36 and other components. The housing 40 includes a peripheral wall 42 and a door 44.

The peripheral wall 42 is situated around the compressors (the first to fifth compression portions 11 to 15), the pressure gauges PG1 to PG6, the safety valves SV1 to SV6, the pressure transmitters PT1 to PT6, the manifolds 31 to 36 and other components. A frame 43 configured by assembling frame materials in a frame shape is situated inside the peripheral wall 42. The peripheral wall 42 is attached to the frame materials constituting the frame 43 and is supported by the frame 43. The frame 43 includes frame materials situated at corners of the housing 40 to constitute struts of the housing 40, frame materials situated in a middle portion in a longitudinal direction of the housing 40 to constitute struts of the housing 40, and frame materials constituting beams which are bridged between the struts.

The peripheral wall 42 includes an opening (not shown). The door 44 has a shape to close the opening, and is attached to the peripheral wall 42 so that the opening is opened and closed. The door 44 includes a generally rectangular visual recognition portion 45 which allows visual recognition from the outside of the peripheral wall 42 for live display portions d of the pressure gauges PG1 to PG6 situated in the housing 40. The visual recognition portion 45 may be formed, for example, using a transparent plate member. With regard to the present embodiment, the door 44 is hinged double doors. However, the door 44 may be a shutter type door or a sliding door.

Figure 3:
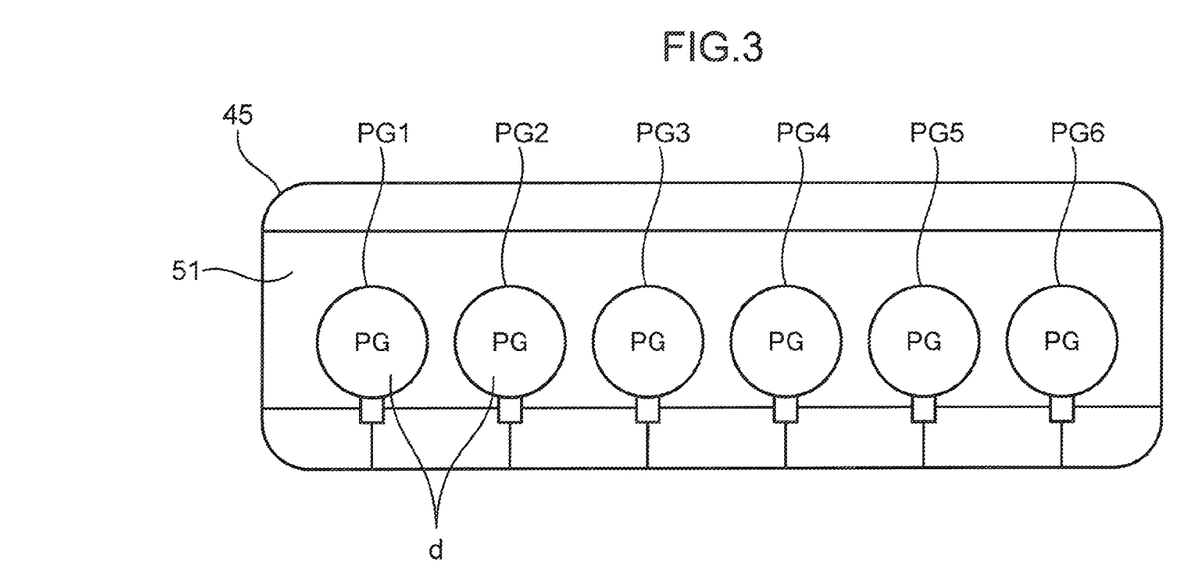
FIG. 3 is a front view of a visual recognition portion of the compression device shown in FIG. 2.
Figure 5:
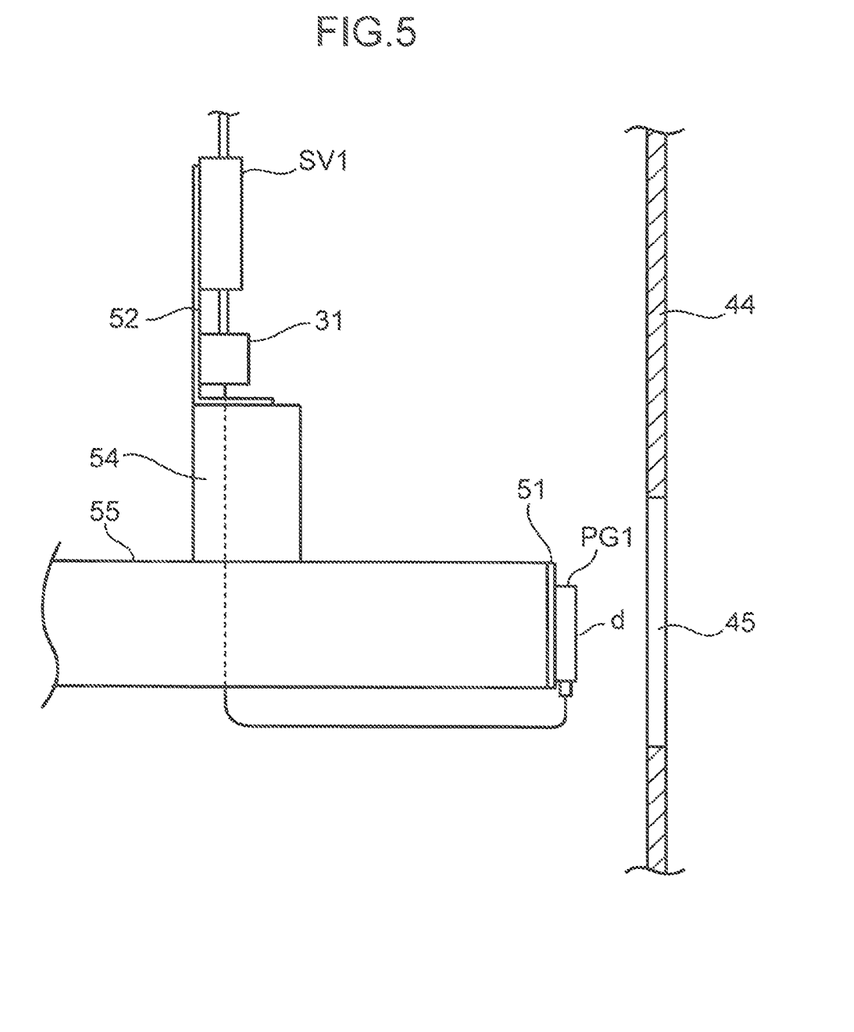
FIG. 5 is a side view of the view shown in FIG. 4.

The compression device 1 of the present embodiment further includes a holding member 51 and a support member 52 situated in the housing 40 as shown in FIGS. 3 to 5.

The holding member 51 holds the pressure gauges PG1 to PG6 altogether so that the pressure gauges PG1 to PG6 are arranged at positions to face the door 44. The pressure gauges PG1 to PG6 are arranged in front of the holding member 51. The manifolds 31 to 36 are situated at positions higher than the holding member 51. The pressure gauges PG1 to PG6 are connected via tubes to the pressure gauge connection ports 30c of the manifolds 31 to 36 so as to detect a pressure of the gas which has flown into the manifolds 31 to 36 from the lines Ls, Lc, Ld. The tubes connecting the pressure gauges PG1 to PG6 with the pressure gauge connection ports 30c extend through a space between the holding member 51 and the manifolds 31 to 36.

The holding member 51 holds the pressure gauges PG1 to PG6 so that the pressure gauges PG1 to PG6 take a posture in which each display portion d faces the door 44 side. The posture in which each display portion d faces the door 44 side is not limited to a posture in which each display portion d and the visual recognition portion 45 are parallel to each other, but may be a posture in which the display portion d is inclined within a range of ±90 degrees with respect to the posture in which the display portion d and the visual recognition portion 45 are parallel to each other. The holding member 51 only has to hold the pressure gauges PG1 to PG6 at positions at which a worker may visually recognize the display portions d of the pressure gauges PG1 to PG6 from the outside of the housing 40 through the visual recognition portion 45. With regard to the present embodiment, the holding member 51 holds the pressure gauges PG1 to PG6 so that the pressure gauges PG1 to PG6 are linearly aligned in the horizontal direction. The position of the holding member 51 in the vertical direction is set so that a row of the display portions d of the pressure gauges PG1 to PG6 is positioned below the upper edge of the visual recognition portion 45 and above the lower edge of the visual recognition portion 45. The position of the holding member 51 in the horizontal direction is set so that there is the row of the display portions d of the pressure gauges PG1 to PG6 between left and right vertical edges of the visual recognition portion 45.

The holding member 51 is formed in a plate shape elongated in one direction, and is arranged to take a posture in parallel to the visual recognition portion 45 so that the holding member 51 extends in the horizontal direction. The holding member 51 is provided with attachment portions for the pressure gauges PG1 to PG6 (e.g. screw holes and through holes), and the attachment portions are arranged at intervals in the horizontal direction. The pressure gauges PG1 to PG6 are attached to a surface of the holding member 51 which faces the visual recognition portion 45.

Both ends of the holding member 51 are connected to a pair of support members 55 provided in the housing, 40 (c.f. FIG. 5). Specifically, both support members 55 are spaced apart from each other in a direction in which the visual recognition portion 45 extends. Each support member 55 includes a member extending linearly in a direction generally perpendicular to a longitudinal direction of the visual recognition portion 45. The support members 55 are arranged on both sides in the longitudinal direction of the visual recognition portion 45 as shoe in FIG. 5, the support members 55 taking a posture to extend toward the door 44 in which the visual recognition portion 45 is formed. Both support members 55 are directly or indirectly supported by frame materials constituting the frame 43. Both ends of the holding member 51 are coupled to the end or a vicinity of the end of each support member 55 at the visual recognition portion 45 side. The support members 55 are used to support various devices and as a foothold for workers.

Connecting plates 54 are connected to the support members 55 at positions spaced rearward from the holding member 51. Each connecting plate 54 extends upward from the support member 55. The support member 52 is connected to be bridged between both connecting plates 54. The support member 52 is positioned above the holding member 51.

The support member 52 supports the manifolds 31 to 36 altogether so that the manifolds 31 to 36 are arranged at positions to face the door 44. However, since the manifolds 31 to 36 are arranged at a higher position than the visual recognition portion 45, it is not possible to visually recognize the manifolds 31 to 36 and the support member 52 from the outside through the visual recognition portion 45. The manifolds 31 to 36 may be arranged at positions at which the manifolds 31 to 36 may be visually recognized from the outside through the visual recognition portion 45.

The support member 52 supports the manifolds 31 to 36 so that the manifolds 31 to 36 are aligned in parallel with a direction in which the pressure gauges PG1 to PG6 are aligned (with regard to the present embodiment, horizontal direction). The support member 52 may be configured using a frame material having a generally T-shaped cross section, the support member 52 extending in the horizontal direction With regard to the present embodiment, the safety valves SV1 to SV6 and the pressure transmitters PT1 to PT6 are also supported by the support member 52. In detail, the support member 52 supports the manifolds 31 to 36, the safety valves SV1 to SV6 and the pressure transmitters PT1 to PT6 so that the manifolds 31 to 36, the safety valves SV1 to SV6 and the pressure transmitters PT1 to PT6 are arranged at positions to face the door 44 and aligned in the horizontal direction.

As described above, with regard to the compression device 1 of the present embodiment, the pressure gauges PG1 to PG6 are arranged at positions to face the door 44 in the housing 40. Therefore, by opening the door 44 on the peripheral wall 42, a worker may easily perform work such as check and maintenance of the pressure gauges PG1 to PG6.

The compression device 1 includes the holding member 51 configured to hold the pressure gauges PG1 to PG6 altogether. In short, the pressure gauges PG1 to PG6 are situated in the housing 40 altogether. Therefore, work such as check and maintenance of the pressure gauges PG1 to PG6 is easily performed.

The holding member 51 holds the pressure gauges PG1 to PG6 altogether so that the pressure gauges PG1 to PG6 take a posture in which the display portions d of the pressure gauges PG1 to PG6 face the door 44, and the door 44 includes the visual recognition portion 45. Therefore, the worker may check the display portions d of the pressure gauges PG1 to PG6 from the outside of the housing 40 without opening the door 44.

The safely valves SV1 to SV6, the pressure transmitters PT1 to PT6 and the manifolds 31 to 36 are arranged at positions to face the door 44. Therefore, the worker may open the door 44 on the peripheral wall 42 to easily perform maintenance or inspection of the safety valves SV1 to SV6, the pressure transmitters PT1 to PT6 and the manifolds 31 to 36.

Each of the manifolds 31 to 36 includes the supply port 30e. Therefore, when gas is externally supplied to the supply port 30c under a condition in which the suction ports and the discharge ports of the compression portions 11 to 15 are closed, it becomes possible to check gas leakage from the lines Ls, Lc, Ld and the pipes 21 to 23 for which the manifolds 31 to 36 are provided. This results in a simpler structure than when the pipes are provided with inspection ports.

The compression device 1 includes the support member 52 supporting the manifolds 31 to 36 so that the manifolds 31 to 36 are aligned in parallel with a direction in which the pressure gauges PG1 to PG6 are aligned. Therefore, work such as check and maintenance of the manifolds 31 to 36 is easily performed as well as the pressure gauges PG1 to PG6.

The present embodiment of the present invention has been described above, but it should be considered that the present embodiment disclosed this time is in all aspects illustrative and not restrictive. The scope of the present invention is indicated by the appended claims rather than by the foregoing description of the present embodiment, and all changes which come within the meaning and scope of the claims and equivalents are therefore intended to be embraced therein.

For example, at least one of the pressure gauges PG1 to PG6 may be arranged at a position to face the door 44.

The visual recognition portion 45 may be omitted.

The pressure gauges PG1 to PG6 may not be arranged altogether as long as the pressure gauges PG1 to PG6 face the door 44.

According to the present embodiment, the pressure gauges PG1 to PG6 are provided for the suction line Ls, the connection lines Lc and the discharge line Ld, respectively. However, the pressure gauge may be provided for at least one of these lines.

Figure 6:
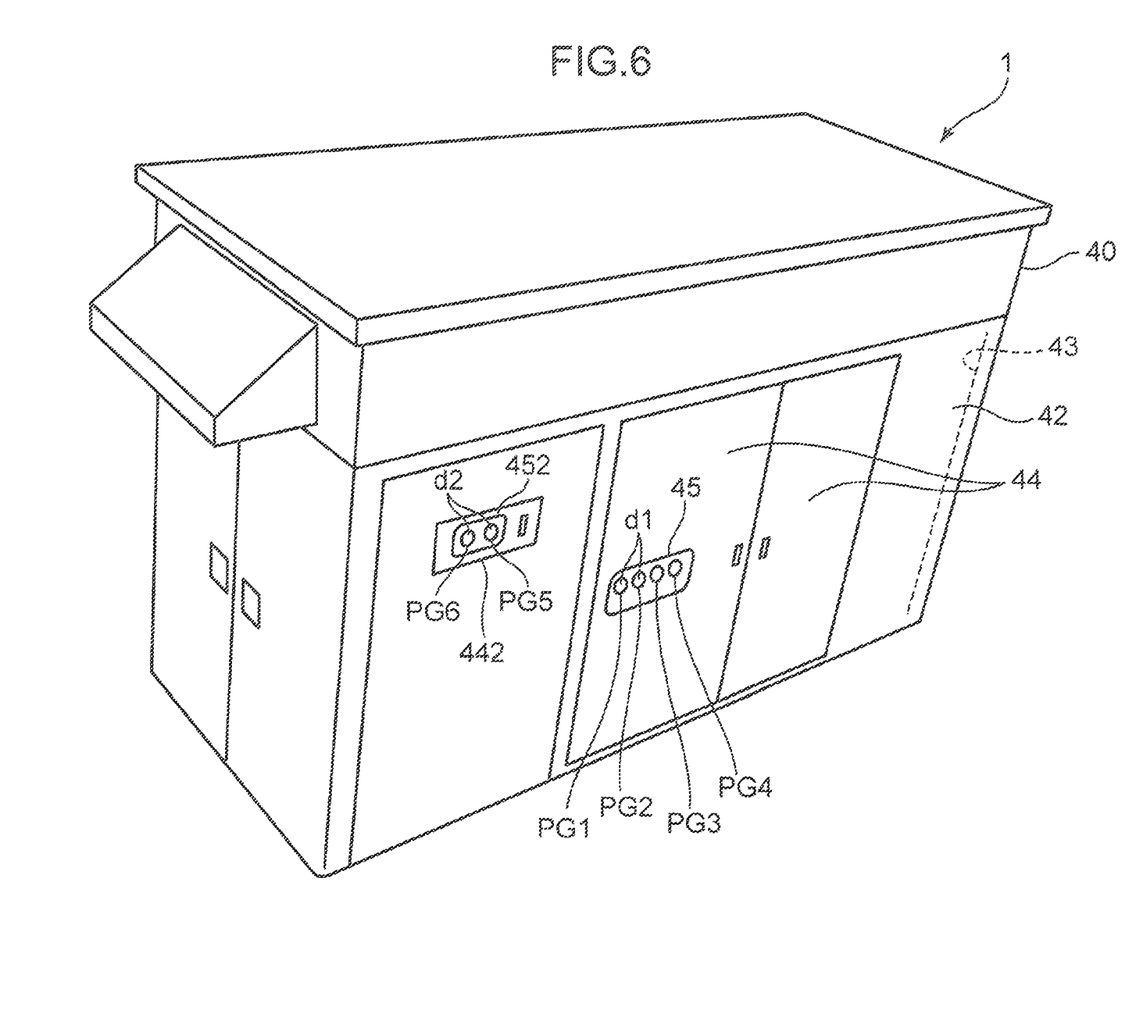
FIG. 6 is a perspective view of a compression device according to another embodiment.

FIG. 6 shows an example in which some pressure gauges PG1 to PG4 and the remaining pressure gauges PG5, PG6 are arranged apart from each other. With regard to this configuration, the visual recognition portion 45 in the door 44 allows the pressure gauges PG1 to PG4 to be visually recognized from the outside, but does not allow the other pressure gauges PG5, PG6 to be visually recognized. A second visual recognition portion 452, which is configured separately from the visual recognition portion 45, allows the other pressure gauges PG5, PG6 (second pressure gauges) to be visually recognized from outside the housing 40.

The peripheral wall 42 includes the door 44 and a second door 442 configured separately from the door 44. The second door 442 is provided on the same surface as the surface of the peripheral wall 42 on which the door 44 is formed. According to the present embodiment, the second door 442 is provided on the right of the door 44. However, the second door 442 may be provided on the left of the door 44. The visual recognition portion 45 is provided on the door 44, and the second visual recognition portion 452 is provided on the second door 442. According to the present embodiment, the second visual recognition portion 452 is formed at a position higher than the visual recognition portion 45. However, the second visual recognition portion 452 may be formed at generally the same height position as the visual recognition portion 45. The display portions d1 of the pressure gauges PG1 to PG4 are arranged in a posture to face the door 44, and the display portions d2 of the remaining pressure gauges PG5, PG6 (second pressure gauges) are arranged in a posture to face the second door 442.

Figure 7:
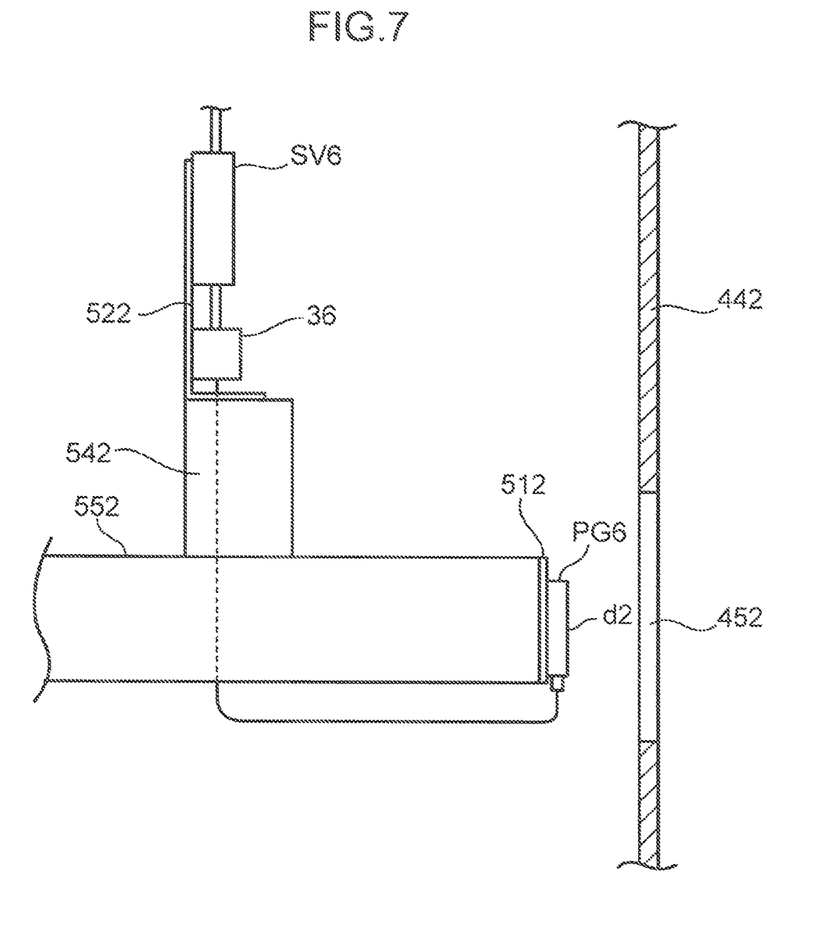
FIG. 7 is a diagram for describing a layout of pressure gauges, manifolds and the like in the compression device according to another embodiment.

The holding member 51 is configured to hold the pressure gauges PG1 to PG4. The other pressure gauges PG5, PG6 are held at positions higher than the pressure gauges PG1 to PG4 by a second holding member 512 provided separately from the holding member 51, as shown in FIG. 7. The holding positions of the pressure gauges PG5, PG6 are set so that the pressure gauges PG5, PG6 may be visually recognized through the second visual recognition portion 452. The configuration of the second holding member 512 is similar to the configuration of the holding member 51. In short, the second holding member 512 is formed in a plate shape elongated in one direction, and is arranged in a posture in parallel to the second visual recognition portion 452 so that the second holding member 512 extends in the horizontal direction. The second holding member 512 is supported at both ends by a pair of second support members 552 provided in the housing 40. The second support members 552 are arranged in a posture to extend toward the second door 442 on which the second visual recognition portion 452 is formed. The second support members 552 are directly or indirectly supported by frame materials constituting the frame 43. Both ends of the second holding member 512 are coupled to the end or a vicinity of the end of each second support member 552 at the second visual recognition portion 452 side.

A connecting plate 542 is connected to each of the second support members 552. The connecting plate 542 extends upward from the second support member 552. A second support member 522 is connected to the connecting plate 542, and the second support member 522 is positioned above the second holding member 512.

The second support member 522 supports the manifolds 35, 36 so that the manifolds 35, 36 are situated at positions to face the second door 442. The second support member 522 also supports the safety valves SV5, SV6 and the pressure transmitters PT5, PT6. An alignment direction of the manifolds 35, 36 is in parallel to an alignment direction of the pressure gauges PG5, PG6.

With regard to the configuration of FIG. 6, the manifolds 31 to 34, the safety valves SV1 to SV4 and the pressure transmitters PT1 to PT4 are supported by the support member 52.

With regard to the configuration shown in FIG. 6, it is possible to easily perform work such as check and maintenance of the pressure gauges PG1 to PG6.

At least one of the safety valves SV1 to SV6 may be situated at a position to face the door 44. Likewise, at least one of the manifolds 31 to 36 may be situated at a position to face the door 44. At least one of the pressure transmitters PT1 to PT6 may be situated at a position to face the door 44.

With regard to the aforementioned embodiment, if a power transmission mechanism is provided between the compression portions 11 to 15 and a drive portion for driving the compression portions 11 to 15, a manifold may be provided to obtain pressure in a space formed in the power transmission mechanism. A safety valve and a pressure transmitter are connected to the manifold. However, a pressure gauge does not have to be attached to the manifold. The manifold may be provided in a side part of the peripheral wall 42 in which the door 44 is provided. In this case, work such as maintenance can be performed more easily.

The aforementioned embodiment mainly includes the compression device having the following configurations.

A compression device according to the aforementioned embodiment includes: compression portions configured to compress gas, respectively; a suction line configured to supply the gas to a compression portion which is situated at a lowest stage side among the compression portions; connection lines configured to connect the compression portions; a discharge line configured to flow the gas which is discharged from a compression portion situated at a highest stage side among the compression portions; pressure gauges including display portions configured to display detected pressure values, the pressure gauges being provided for at least one of the suction line, the connection lines and the discharge line; and a housing in which the compression portions and the pressure gauges are stored. The housing includes: a peripheral wall situated at least around the compression portions and the pressure gauges; and a door configured to open and close an opening formed on the peripheral wall. The display portions of the pressure gauges are situated at positions to face the door.

With regard to the aforementioned compression device, the pressure gauges are situated at positions at which the display portions face the door in the housing. Therefore, a worker opens the door on the peripheral wall to easily perform work such as check and maintenance of the pressure gauges.

The compression device may further include: second pressure gauges including display portions configured to display detected pressure values, the second pressure gauges being provided for any lines of the suction line, the connection lines and the discharge line; and a holding member configured to hold the pressure gauges and the second pressure gauges altogether.

In this aspect, the pressure gauges are arranged altogether, so that the work such as check and maintenance of the pressure gauges is easily performed.

With regard to the aforementioned compression device, the holding member may hold the pressure gauges and the second pressure gauges altogether so that the display portions of the pressure gauges and the display portions of the second pressure gauges take a posture to be oriented toward the door. The door may include a visual recognition portion configured to allow visual recognition of the display portions of the pressure gauges and the display portions of the second pressure gauges from outside of the housing.

In this aspect, the worker may check the display portion of each pressure gauge from outside of the housing without opening the door.

The compression device may further include safety valves provided for lines of the suction line, the connection lines and the discharge line, the pressure gauges being placed on the lines. The safety valves may be situated at positions to face the door.

In this aspect, the worker may open the door on the peripheral wall to easily perform maintenance or inspection of the safety valves.

The compression device may further include pressure transmitters provided for lines of the suction line, the connection lines and the discharge line, and configured to transmit detected pressure values of the pressure transmitters, the pressure gauges being placed on the lines. The pressure transmitters may be situated at positions to face the door.

In this aspect, the pressure values transmitted from the pressure transmitters may be appropriately processed by a control device or the like, and maintenance or inspection of the pressure transmitters is easily performed.

The compression device may further include manifolds provided for lines of the suction line, the connection lines and the discharge line, the pressure gauges being placed on the lines. Each of the manifolds may include: an inlet port configured to be connected to the lines on which the pressure gauges are placed, the inlet port being configured to allow inflow of the gas from the lines; an outlet port configured to allow outflow of the gas which has entered from the inlet port, the outlet port being connected to pipes on which the safety valves are placed; a pressure gauge connection port in communication with the inlet port and the outlet port, the pressure gauges being connected to the pressure gauge connection port; and a pressure transmitter connection port in communication with the inlet port and the outlet port, the pressure transmitters being connected to the pressure transmitter connection port. The manifolds may be situated at positions to face the door.

In this aspect, there are less couplings than when the pressure gauges, the safety valves and the pressure transmitters are connected to the pipes. Maintenance or inspection of the manifolds are easily performed.

With regard to the aforementioned compression device, each of the manifolds may further include a supply port for supplying the gas, the supply port being in communication with the inlet port and the outlet port.

In this aspect, it becomes possible to inspect gas leakage from the lines provided with the manifolds when gas is supplied from the supply ports to the manifolds under a condition in which the suction port and the discharge port of each compression portion are closed. Therefore, there is a simpler structure than when the pipes are provided with inspection ports.

The compression device may further include: second pressure gauges including display portions configured to display detected pressure values, the second pressure gauges being provided for any lines of the suction line, the connection lines and the discharge line; second manifolds provided for the lines of the suction line, the connection lines and the discharge line, the second pressure gauges being placed on the lines; a holding member configured to hold the pressure gauges and the second pressure gauges altogether to linearly align the pressure gauges and the second pressure gauges; and a support member configured to support the manifolds and the second manifolds to align the manifolds and the second manifolds in parallel to an alignment direction of the pressure gauges and the second pressure gauges.

In this aspect, since the pressure gauges and the manifolds are arranged in a straight line altogether, it is easy to perform work such as check and maintenance of the pressure gauges and the manifolds.

The compression device may further include: second pressure gauges including display portions configured to display detected pressure values, the second pressure gauges being provided for any lines of the suction line, the connection lines and the discharge line: a holding member configured to hold the pressure gauges; and a second holding member configured separately from the holding member, the second holding member being configured to hold the second pressure gauges. The housing may include a second door formed separately from the door, the second door being configured to open and close an opening formed on the peripheral wall. The door may include a visual recognition portion configured to allow visual recognition from outside of the housing. The second door may include a second visual recognition portion configured to allow visual recognition from outside of the housing. The holding member may hold the pressure gauges at positions at which the display portions of the pressure gauges are visually recognized through the visual recognition portion of the door. The second holding member may hold the second pressure gauges at positions at which the display portions of the second pressure gauges are visually recognized through the second visual recognition portion.

In this aspect, the worker may check the display portions of the pressure gauges from outside of the housing without opening the door, and check the display portions of the second pressure gauges from outside of the housing without opening the second door.

The compression device may easily perform maintenance or inspection of instruments situated in the housing.

INDUSTRIAL APPLICABILITY

The compression device is suitably used in various technical fields which require compressed gas.

This application is based on Japanese Patent application No. 2018-108771 filed in Japan Patent Office on Jun. 6, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A compression device comprising:
   compression portions configured to compress gas, respectively;
   a suction line configured to supply the gas to a compression portion which is situated at a lowest stage side among the compression portions;
   connection lines configured to connect the compression portions;
   a discharge line configured to flow the gas which is discharged from a compression portion situated at a highest stage side among the compression portions;
   a pressure gauge including a display portions configured to display a detected pressure values, the pressure gauges being provided for the suction line;
   a pressure transmitter provided for the suction line and configured to transmit the detected pressure value; and
   a manifold provided in such a manner as to allow a part of the gas flowing through the suction line to branch out from the suction line and flow in the manifold;
   a housing in which the compression portions, the pressure gauge, the pressure transmitter and the manifold are stored,
   wherein the housing includes:
      a peripheral wall situated at least around the compression portions, the pressure gauges, the pressure transmitter and the manifold; and
      a door configured to open and close an opening formed on the peripheral wall, and
   wherein the manifold includes:
      an inlet port configured to allow inflow of the part of the gas;
      an outlet port configured to allow outflow of the gas which has entered from the inlet port, the outlet port being connected to a pipe on which a safety valve is placed, a flow of the gas being stopped at the safety valve;
      a pressure gauge connection port in communication with the inlet port and the outlet port, the pressure gauge being connected to the pressure gauge connection port; and
      a pressure transmitter connection port in communication with the inlet port and the outlet port, the pressure transmitter being connected to the pressure transmitter connection port; and
   wherein the manifold is situated at a position to face the door so that the display portions of the pressure gauges and the pressure transmitter face the door.

2. The compression device according to claim 1, further comprising:
   second pressure gauges including display portions configured to display detected pressure values, the second pressure gauges being provided for any lines of the suction line, the connection lines and the discharge line; and
   a holding member configured to hold the pressure gauges and the second pressure gauges altogether.

3. The compression device according to claim 2,
   wherein the holding member holds the pressure gauges and the second pressure gauges altogether so that the display portions of the pressure gauges and the display portions of the second pressure gauges take a posture to be oriented toward the door, and
   wherein the door includes a visual recognition portion configured to allow visual recognition of the display portions of the pressure gauges and the display portions of the second pressure gauges from outside of the housing.

4. The compression device according to claim 1,
   wherein the safety valves is situated at a positions to face the door.

5. The compression device according to claim 1,
   wherein the manifold further includes a supply port for supplying the gas, the supply port being in communication with the inlet port and the outlet port.

6. The compression device according to claim 1, further comprising:
   second pressure gauges including display portions configured to display detected pressure values, the second pressure gauges being provided for any lines of the suction line, the connection lines and the discharge line;
   second manifolds provided for the lines of the suction line, the connection lines and the discharge line, the second pressure gauges being attached to the second manifolds;
   a holding member configured to hold the pressure gauge and the second pressure gauges altogether to linearly align the pressure gauges and the second pressure gauges; and
   a support member configured to support the manifolds and the second manifolds to align the manifold and the second manifolds in parallel to an alignment direction of the pressure gauges and the second pressure gauges.

7. The compression device according to claim 1, further comprising:
   second pressure gauges including display portions configured to display detected pressure values, the second pressure gauges being provided for any lines of the suction line, the connection lines and the discharge line;
   a holding member configured to hold the pressure gauge; and
   a second holding member configured separately from the holding member, the second holding member being configured to hold the second pressure gauges,
   wherein the housing includes a second door formed separately from the door, the second door being configured to open and close an opening formed on the peripheral wall,
   wherein the door includes a visual recognition portion configured to allow visual recognition from outside of the housing,
   wherein the second door includes a second visual recognition portion configured to allow visual recognition from outside of the housing,
   wherein the holding member holds the pressure gauges at a positions at which the display portions of the pressure gauges is visually recognized through the visual recognition portion of the door, and wherein the second holding member holds the second pressure gauge at positions at which the display portions of the second pressure gauges are visually recognized through the second visual recognition portion.

8. A compression device comprising:
compression portions configured to compress gas, respectively;
a suction line configured to supply the gas to a compression portion which is situated at a lowest stage side among the compression portions;
connection lines configured to connect the compression portions;
a discharge line configured to flow the gas which is discharged from a compression portion situated at a highest stage side among the compression portions;
a pressure gauge including a display portion configured to display a detected pressure value, the pressure gauge being provided for the discharge line;
a pressure transmitter provided for the discharge line and configured to transmit the detected pressure value; and
a manifold provided in such a manner as to allow a part of the gas flowing through the discharge line to branch out from the discharge line and flow in the manifold;
a housing in which the compression portions, the pressure gauge, the pressure transmitter and the manifold are stored,
wherein the housing includes:
    a peripheral wall situated at least around the compression portions, the pressure gauge, the pressure transmitter and the manifold; and
    a door configured to open and close an opening formed on the peripheral wall, and
wherein the manifold includes:
    an inlet port configured to allow inflow of the part of the gas;
    an outlet port configured to allow outflow of the gas which has entered from the inlet port, the outlet port being connected to a pipe on which a safety valve is placed, a flow of the gas being stopped at the safety valve;
    a pressure gauge connection port in communication with the inlet port and the outlet port, the pressure gauge being connected to the pressure gauge connection port; and
    a pressure transmitter connection port in communication with the inlet port and the outlet port, the pressure transmitter being connected to the pressure transmitter connection port; and
wherein the manifold is situated at a position to face the door so that the display portion of the pressure gauge and the pressure transmitter face the door.

9. A compression device comprising:
compression portions configured to compress gas, respectively;
a suction line configured to supply the gas to a compression portion which is situated at a lowest stage side among the compression portions;
connection lines configured to connect the compression portions;
a discharge line configured to flow the gas which is discharged from a compression portion situated at a highest stage side among the compression portions;
a pressure gauge including a display portion configured to display a detected pressure value, the pressure gauge being provided for one of the connection lines;
a pressure transmitter provided for the one of the connection lines and configured to transmit the detected pressure value; and
a manifold provided in such a manner as to allow a part of the gas flowing through the one of the connection lines to branch out from the one of the connection lines and flow in the manifold;
a housing in which the compression portions, the pressure gauge, the pressure transmitter and the manifold are stored,
wherein the housing includes:
    a peripheral wall situated at least around the compression portions, the pressure gauge, the pressure transmitter and the manifold; and
    a door configured to open and close an opening formed on the peripheral wall, and
wherein the manifold includes:
    an inlet port configured to allow inflow of the part of the gas;
    an outlet port configured to allow outflow of the gas which has entered from the inlet port, the outlet port being connected to a pipe on which a safety valve is placed, a flow of the gas being stopped at the safety valve;
    a pressure gauge connection port in communication with the inlet port and the outlet port, the pressure gauge being connected to the pressure gauge connection port; and
    a pressure transmitter connection port in communication with the inlet port and the outlet port, the pressure transmitter being connected to the pressure transmitter connection port; and
wherein the manifold is situated at a position to face the door so that the display portion of the pressure gauge and the pressure transmitter face the door.

* * * * *